(12) United States Patent
Izumi et al.

(10) Patent No.: US 6,464,033 B2
(45) Date of Patent: Oct. 15, 2002

(54) ENGINE SUPPORTING DEVICE FOR A VEHICLE

(75) Inventors: Yoshio Izumi; Hitoshi Yokotani, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/015,904

(22) Filed: Jan. 30, 1998

(65) Prior Publication Data

US 2001/0001995 A1 May 31, 2001

(30) Foreign Application Priority Data

Jan. 31, 1997 (JP) .............................................. 9-053789
May 20, 1997 (JP) .............................................. 9-130000

(51) Int. Cl.⁷ ............................................... B60K 8/00
(52) U.S. Cl. ....................................... 180/291; 180/182
(58) Field of Search ................................ 180/379, 381, 180/382, 182, 183, 184, 291, 299, 300, 312

(56) References Cited

U.S. PATENT DOCUMENTS

| 3,776,354 A | * 12/1973 | Duclo et al. ................ 180/296 |
| 3,985,192 A | * 10/1976 | Samuelson et al. ......... 180/190 |
| 5,060,745 A | * 10/1991 | Yasui et al. ................. 180/193 |
| 5,129,479 A | * 7/1992 | Fujii et al. .................. 180/297 |
| 5,372,215 A | * 12/1994 | Fukuda ........................ 180/190 |
| 5,699,872 A | * 12/1997 | Miyakawa et al. ......... 180/291 |
| 5,740,876 A | * 4/1998 | Shimose et al. ............ 180/232 |

FOREIGN PATENT DOCUMENTS

| JP | B2-61 27202 | 6/1986 |
| JP | A-61 295129 | 12/1986 |
| JP | B2-5 17048 | 3/1993 |

* cited by examiner

Primary Examiner—Brian L. Johnson
Assistant Examiner—Christopher Bottorff
(74) Attorney, Agent, or Firm—Birch, Stewart, Kolasch & Birch, LLP

(57) ABSTRACT

To provide a structure for stably supporting an engine in which front and rear portions of the engine are elastically supported. A drive pulley of a V-belt type transmission is mounted on an end portion of a crank shaft of the engine. A driven pulley of the V-belt type transmission is mounted to an input shaft of a gear box. The engine and the gear box are separately supported on the body side. A crank case of the engine is supported on the body side through a front side elastic mount and a rear side elastic mount disposed at front and rear portions. A ring bushing is fitted in a front side body mounting portion provided on a front portion of the crank case, and a mount rubber is fitted in a rear side body mounting portion. The front side elastic mount of the front side body mounting portion is higher in hardness than the rear side elastic mount of the rear side body mounting portion.

11 Claims, 14 Drawing Sheets

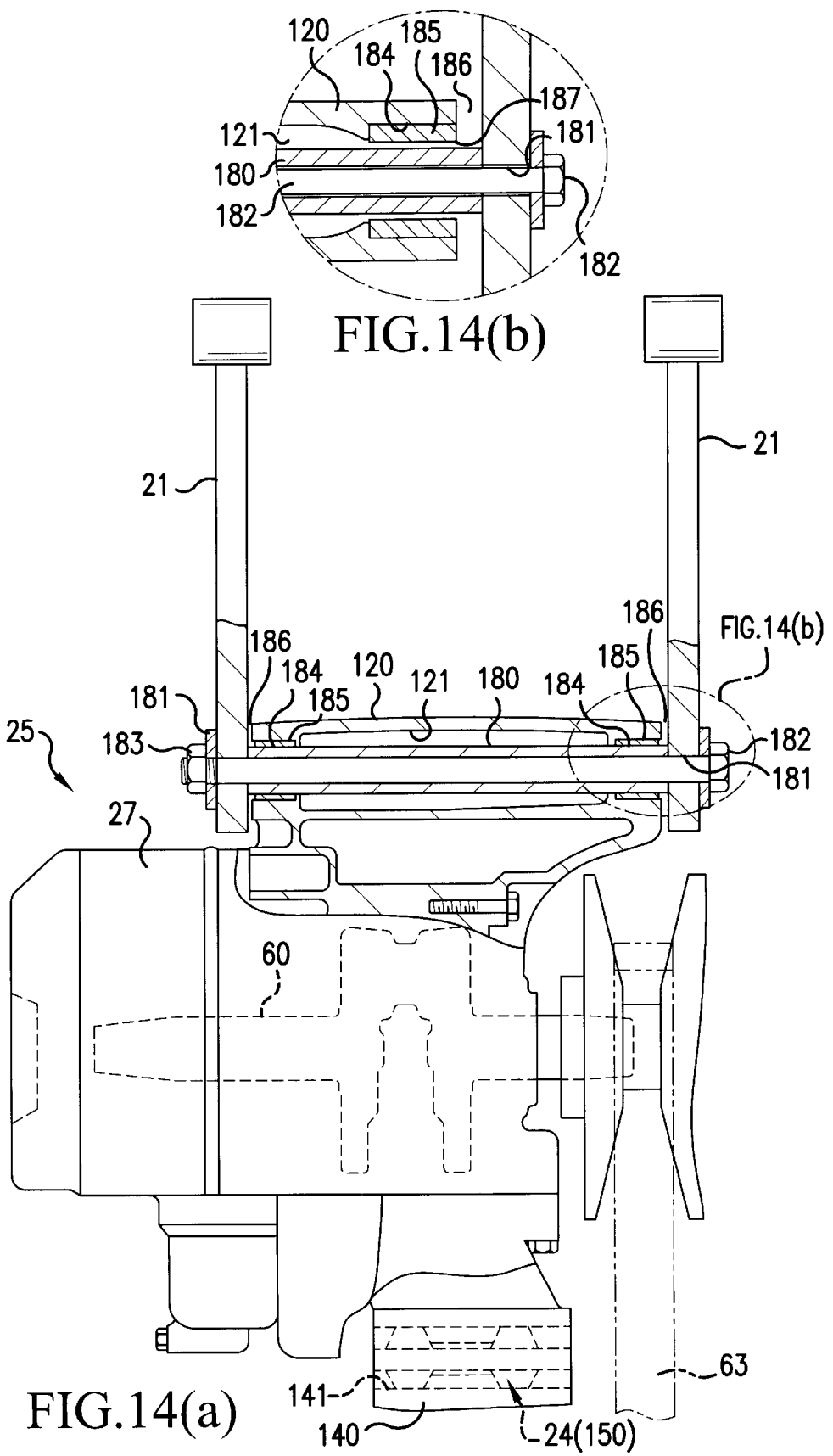

ENGINE SUPPORTING DEVICE FOR A VEHICLE

BACKGROUND OF THE INVENTION

1. Field of the Invention

The present invention relates to an engine supporting device for a vehicle such as a snowmobile or the like.

2. Description of Background Art

Japanese Patent Publication No. Sho 61-27202 discloses a snowmobile in which front and rear portions of an engine are mounted to a vehicular body through rubber members; a reduction gear case is supported on the vehicular body separately from the engine; and power is transmitted from the engine to the reduction gear through a V-belt type transmission. Japanese Patent Laid-open No. Sho 61-295129 discloses a structure in which an engine including a power transmission system similar to that described above is connected to a reduction gear case through a damper. Japanese Patent Publication No. Hei 5-17048 disclosed a structure in which a power transmission system similar to that described above is used and an engine is connected to a reduction gear case through a link mechanism.

Incidentally, in cases similar to the above-described structures where an engine having an output shaft provided with a drive pulley and a reduction gear case having an input shaft provided with a driven pulley are separately supported on a vehicular body and a belt is wound around the drive pulley and the driven pulley, vibration is applied from the driven pulley to the engine against a drive force applied from the drive pulley side to the driven pulley.

On the other hand, it is known that an engine may be supported on a vehicular body through elastic members positioned at least at two points on front and rear sides of a crank case. However, if the elastically supporting structure is used for the above-described power transmission system, the elastic members at the front and rear mounting portions are deformable at random, and accordingly, the engine may be, at each mounting portion, turned around a mounting shaft of the elastic member and/or moved in the direction perpendicular to the mounting shaft, for example, in the longitudinal direction.

To be more specific, each mounting portion functions as a supporting point around which the engine is turned due to vibration of the engine, and also functions to move the engine in the direction perpendicular to the mounting shaft. As a result, vibration of the entire engine becomes larger, and thereby a distance between the drive pulley and the driven pulley tends to vary.

Accordingly, in the structure disclosed in Japanese Patent Publication No. Sho 61-27202 or Japanese Patent Laid-open No. Sho 61-295129, vibration of the engine cannot be suppressed, which may exert an adverse effect on accessories. Further, the configuration disclosed in the Japanese Patent Publication No. Hei 5-17048 can solve such a problem. However, it requires a high level technique in terms of the setting of a link mounting angle or the like.

SUMMARY AND OBJECTS OF THE INVENTION

To solve the above problem, according to the present invention, there is provided an engine supporting device for a vehicle in which an engine and a gear box containing a reduction gear train are separately formed and separately supported on a vehicular body. A drive pulley of a V-belt type transmission is provided on an output shaft of the engine and a driven pulley of the V-belt type transmission is provided on an input shaft of the gear box. A V-belt is wound around the drive pulley and the driven pulley. The engine supporting device includes two mounting portions supported by the vehicular body, which are provided on a crank case of the engine on front and rear sides of the drive pulley in such a manner that the drive pulley is put between the mounting portions wherein one of the front and rear mounting portions mainly functions as a supporting point around which the engine is turned due to a drive reaction force of the V-belt type transmission. The other of the front and rear mounting portions is mounted on the vehicular body by a mounting shaft through an elastic member and mainly functions as a member for absorbing the vibration of the engine by deformation of the elastic member.

In the above engine supporting device, preferably, the front and rear mounting portions are mounted on the vehicular body through front and rear elastic members respectively. One of the front and rear elastic members is higher in hardness than the other of the front and rear elastic members, or either of the front and rear elastic members is formed of a ring bush.

Further, in the above engine supporting device, preferably, the mounting portion mainly functions as a supporting point around which the engine is turned is connected to the vehicular body through a tension rod, or is connected to the vehicular body through a mounting shaft and a collar or bearing turnably supporting the mounting shaft.

Since either of the front and rear mounting portions mainly functions as a supporting point around which the engine is turned, when the engine is applied with a drive reaction force of the V-belt type transmission, the movement of the engine in the longitudinal direction of the body is restricted because the supporting point around which the engine is turned substantially lies on the extension of a belt line. In the other mounting portion, the elastic member is elastically deformed to move the engine in the direction perpendicular to the mounting shaft, to thus absorb vibration of the engine.

In this way, the main functions for suppressing vibration of the engine can be differently distributed to the front and rear mounting portions by a relatively simple structure, as a result of which the movement of the entire engine due to vibration of the engine can be suppressed and thereby a change in distance between the drive pulley and the drive pulley can be reduced.

Since vibration of the engine can be thus suppressed, vibration transmitted to accessories can also be reduced, to thereby enhance the durability and improve the riding comfort. Such an engine supporting structure can be provided without necessity of any special high level technique.

In the case where the front and rear mounting portions are connected to the vehicular body through the front and rear elastic members, if the hardness of the front and rear elastic members are different from each other, the mounting portion using the harder elastic member mainly functions as a supporting point around which the engine is turned, and the other mounting portion mainly functions to absorb vibration of the engine with the elastic member of the mounting portion being relatively largely moved in the direction perpendicular to the mounting shaft. Further, the functions can be distributed to the front and rear mounting portions with an extremely simply structure in which the hardness of the elastic members are made different from each other.

In the case where the front and rear mounting portions are connected to the vehicular body through the front and rear elastic members, if one of the elastic members is formed of the ring bush, the ring bushing is liable to mainly function as a supporting point around which the engine is turned because the ring bushing is, in general, elastically harder. Accordingly, the functions can be simply distributed to the front and rear mounting portions only by changing the form of the elastic members.

In the case where one mounting portion is connected to the vehicular body through the tension rod, the tension rod allows the engine to be turned and to be restricted in its the longitudinal movement due to vibration of the engine, and the other mounting portion can absorb vibration of the engine by elastic deformation of the elastic member.

Further, in the case where one mounting portion is connected to the vehicular body not through the elastic member but through the mounting shaft and the collar or bearing for turnably supporting the mounting shaft, the mounting shaft of the mounting portion acts as the center of the turning of the engine and thereby the position of the turning center of the engine can be kept constant, and the other mounting portion can absorb vibration of the engine by elastic deformation of the elastic member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 14(a) and 14(b) are views, similar to FIG. 13, showing a further embodiment.

DETAILED DESCRIPTION OF THE PREFERRED EMBODIMENTS

Figure 1:
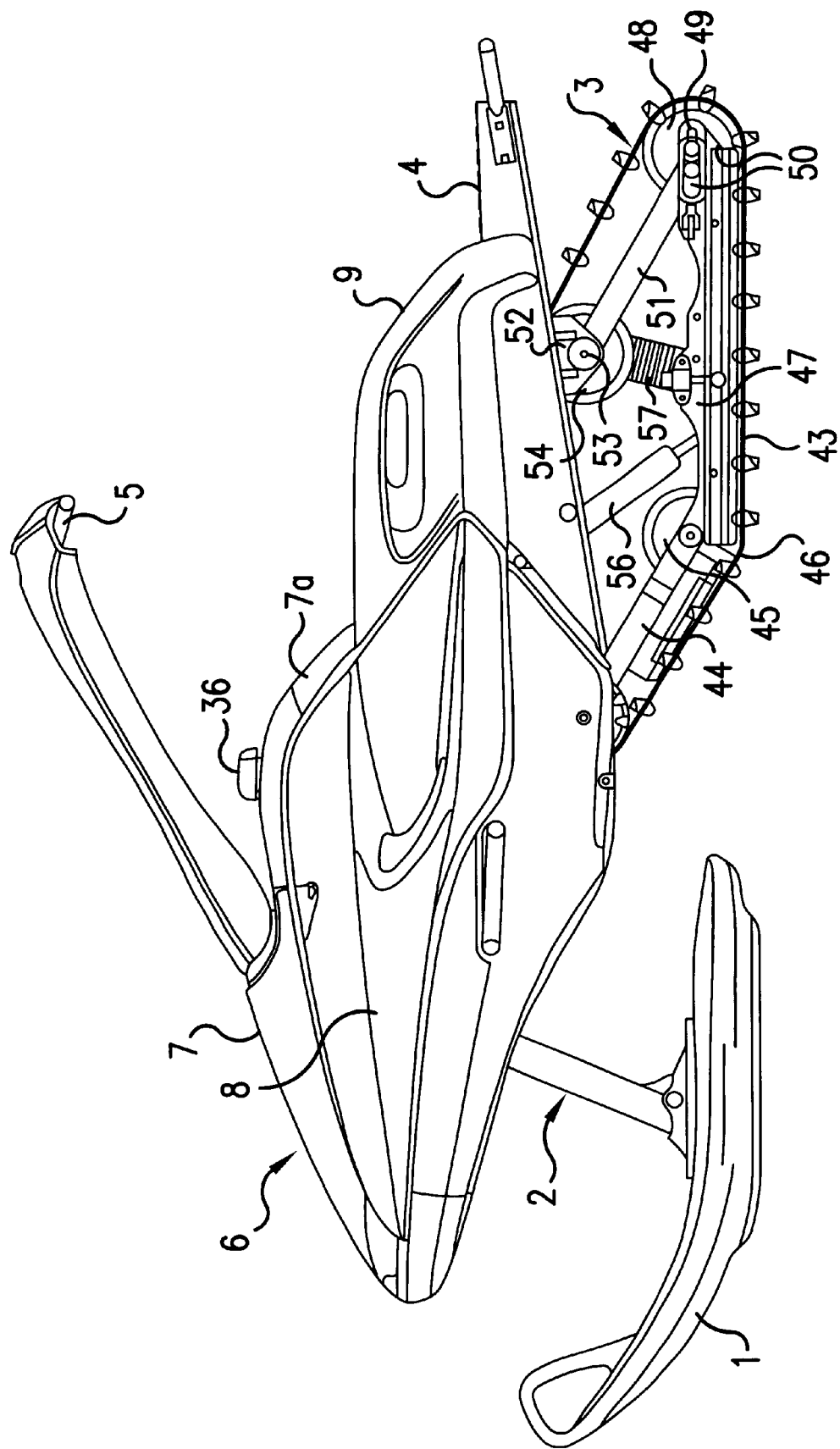
FIG. 1 is a side view of a snowmobile.

A schematic structure of the entire snowmobile will be first described with reference to FIGS. 1 and 2. The snowmobile includes a front body thereof having a steering ski 1 supported by a telescopic type erecting front suspension 2, and at a rear body thereof a track device 3 driven by an engine (described later).

A floor 4 is provided over the track device 3. A driver stands on the floor 4 and operates a handlebar 5. The floor 4 is formed into an approximately reversed U-shape in transverse cross section. Right and left side surfaces of the floor 4 are taken as erected walls.

A body cover 6 for covering a body includes a front cover 7, side covers 8, and a rear cover 9. The front cover 7 covers a portion extending rearward over an engine room at the front body. The side covers 8 cover portions of the body on both sides of the front cover 7. The rear cover 9 extends longer rearwardly from the side covers 8 along right and left sides of the floor 4 and covers side portions of a driver's space over the floor 4.

Figure 2:
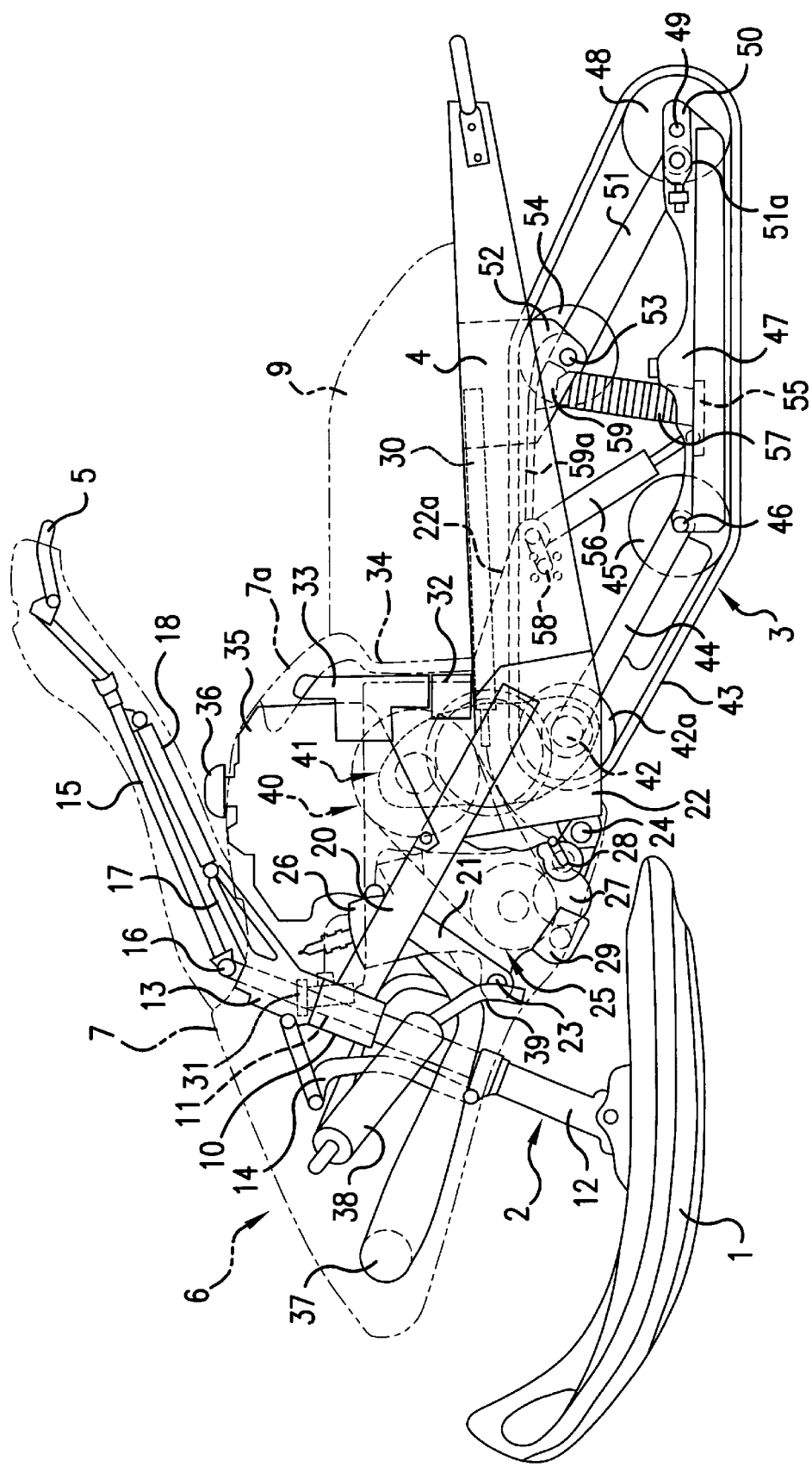
FIG. 2 is a side view of the snowmobile in a state in which a body cover is removed.

As will be apparent from FIG. 2, a head pipe 10 is provided at the front body and the front suspension 2 is fixedly surrounded by the head pipe 10. An inner tube 11 of the front suspension 2 extends obliquely in the vertical direction with a lower end portion thereof turnably supported by an outer tube 12.

A handle boss 13 is mounted around an outer periphery of an upper end portion of the inner tube 11 in such a manner as to be turnable with the inner tube 11 taken as a pivot and to be axially fixed. The handle boss 13 is connected to the upper end portion of the outer tube 12 with a suspension link 14.

The suspension link 14 is extensible by vertical movement of the outer tube 12. An intermediate portion of the suspension link 14 projects in a state being bent forwardly so as to sufficiently ensure a chamber space (described later) surrounded by a portion of the body cover 6 positioned in front of the head pipe 10.

A lower end portion of a handle post 15 is connected to a top portion of the handle boss 13 in such a manner as to be vertically rockable through a handle post pivot 16. A handle link 18 composed of a damper is mounted between a link stay 17 and a portion of the handle post 15 near the handlebar 5. The link stay 17 integrally extends obliquely upwardly and rearwardly from the top portion of the handle boss 13.

These front suspension 2, head pipe 10, and handle boss 13 form a steering shaft of the steering ski 1. The handle post pivot 16 is positioned between a rear end portion of the steering ski 1 and a front end portion of the track device 3.

A pair of right and left main frames 20 extend obliquely downwardly and rearwardly from the head pipe 10. Each main frame 20 has a down-tube 21 and a pivot plate 22. The down-tube 21 extends obliquely forwardly and downwardly from a portion of the main frame 20 near the head pipe 10, and the pivot plate 22 extends downwardly from a rear portion of the main frame 20.

A water-cooled type two-cycle/single-cylinder engine 25 is supported on the down-tubes 21 and the pivot plates 22 through a front side elastic mount 23 and a rear side elastic mount 24. A cylinder portion 26 of the engine 25 is positioned between the right and left main frames 20, and the center of the engine 25 is positioned at approximately a central portion of the body.

A water pump 28 and an oil pump 29 are provided on a lower portion of a crank case 27 constituting the engine 25. The water pump 28 is used to supply cooling water from a heat exchanger 30 contained in a ceiling portion of the floor 4 into the cylinder portion 26.

The hot water from the cylinder portion 26 is fed to the heat exchanger 30 to be effectively cooled, and is then returned into the water pump 28. A water inlet 31 of the heat exchanger 30 is provided sidewardly of the head pipe 10.

The heat exchanger 30, which has a width nearly equal to a width of the ceiling portion of the floor 4, has a wide surface area. Also, the heat exchanger 30 is superimposed on the ceiling portion of the floor 4 in the vertical direction to mutually increase the rigidity of the heat exchanger 30 and the floor 4.

The oil pump 29 is connected to an oil tank 33 supported on an upper front portion of the floor 4 together with a battery 32. The work for maintenance of the battery 32 and the oil tank 33 can be performed by opening a lid 34 formed to a partitioning wall 7a which longitudinally partitions the driver's space over the floor 4 from the engine room in front of the driver space.

The partitioning wall 7a is formed of a portion of the front cover 7 which extends around to a back surface of a fuel tank 35 while covering an upper surface of the fuel tank 35. The fuel tank 35 is positioned in front of the battery 32 and the oil tank 33 and is supported on the main frames 20. A tank cap 36 is provided on the fuel tank 35.

An exhaust chamber 37 extends forward from an exhaust port of the engine 25, and is arranged in the chamber space surrounded by the body cover 6 positioned in front of the engine 25. In the chamber space, the exhaust chamber 37 extends in the form of an approximately semi-circular shape in a plan view along the inner surface of the body cover 6. A silencer 38 connected to the exhaust chamber 37 is disposed along the upper side of the exhaust chamber 37. The piping of the exhaust system thus meanders in approximately a two-stage manner. The exhaust gas is finally exhausted downwardly toward the front side of the engine 25 from a tail pipe 39.

A drive output of the engine 25 is transmitted through a V-belt type transmission 40 to a gear box 41 containing a final reduction gear mechanism. The gear box 41 is supported on the main frames 20 and the pivot plates 22 and is adapted to finally reduce the drive force transmitted from the V-belt type transmission 40 and to rotate a drive shaft 42.

Drive wheels 42a are integrally supported by the drive shaft 42, and are rotated integrally with the drive shaft 42. Outer peripheral portions of the drive wheels 42a are meshed with irregularities formed on the inner surface of a track belt 43 for driving the track belt 43.

With respect to the drive shaft 42, the left end portion is supported by the pivot plate 22 and the right end portion is supported by the gear box 41. Front end portions of a pair of right and left rear arms 44 extending obliquely downwardly and rearwardly are turnably supported around both the end portions of the drive shaft 42.

Both rear end portions of the rear arms 44 are connected to front end portions of right and left side rails 47 extending in parallel to each other through an idle shaft 46 of an idle wheel 45.

Shaft position adjusting plates 50 for supporting the idle shaft 49 of the idle wheel 48 are supported by both rear end portions of the side rails 47 in such a manner as to be movable fore and aft. A lower end portion of a rear link 51 disposed in parallel to the rear arm 44 is connected to each shaft position adjusting plate 50 through a connecting member 51a.

An upper end portion of the rear link 51 is rotatably mounted to a stay 52 projecting downwardly from a side surface of the floor 4 through an idle shaft 53. A track belt 43 is wound around the idle wheels 54 supported by the idle shaft 53, additional idle wheels 46 and 48, and the drive wheels 42a supported by the drive shaft 42, to constitute the track device 3.

The track device 3 forms a parallelogram link formed of the floor 4, rear arms 44, side rails 47, and rear links 51. A cross-plate 55 is formed between intermediate portions of the right and left side rails 47, and both a damper 56 and a suspension spring 57, which constitute a rear suspension, extending obliquely and vertically from the cross-plate 55 in such a manner as to be widen toward the upper side in a side view.

An upper end portion of the damper 56 is supported by a cross-pipe 58 supported between right and left extensions 22a extending rearwardly in the floor 4 from rear portions of the pivot plates 22. An upper end portion of the suspension spring 57 is supported by a spring holder 59 turnably supported by the idle shaft 53. The spring holder 59 is supported by a rear end portion of a spring holder rod 59a. The spring holder rod 59a extends rearwardly with its front end co-fastened with an upper end portion of the damper 56.

Next, a detailed structure of the drive/power transmission system will be described with reference to FIGS. 3 to 8. The drive/power transmission system is constituted of the engine 25, V-belt type transmission 40 and gear box 41, which are disposed in an approximately N-shape (see FIG. 5). As will be apparent from FIG. 4, the engine 25 is a two cycle engine in which air is sucked from a carburetor 19 into a crank case 27 and is preliminarily compressed in the crank case 27.

Figure 3:
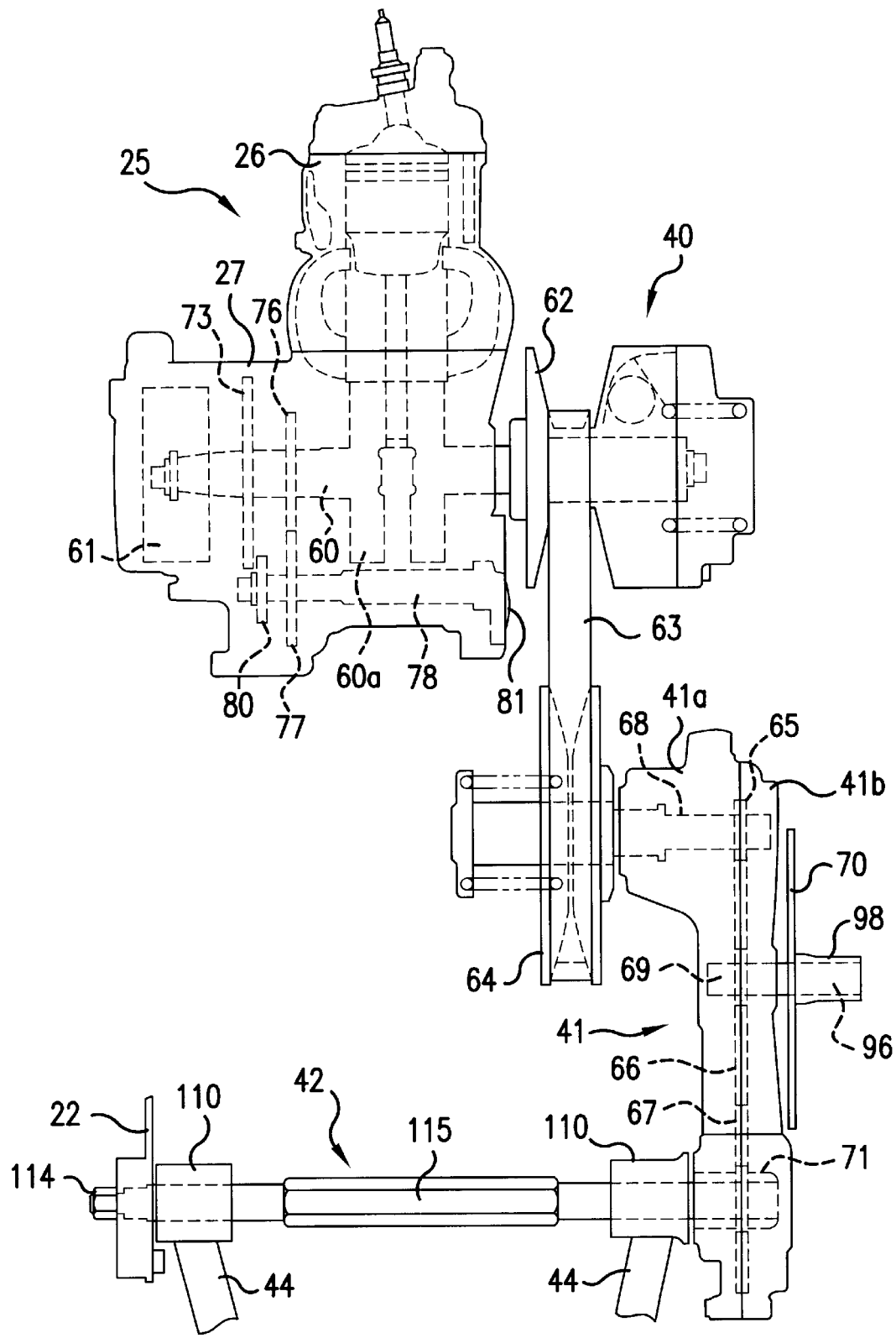
FIG. 3 is a schematic plan view in development of a drive/power transmission system.

FIG. 3 shows a schematic configuration of the drive/power transmission system. Referring to FIG. 3, one end of a crank shaft 60 of the engine 25 is mounted with an ACG 61 and the other end thereof extends outwardly from the crank case 27. A drive pulley 62 constituting the known V-belt type transmission 40 is mounted on the extension of the crank shaft 60.

In the V-belt type transmission 40, a V-belt 63 is wound around the drive pulley 62 and a driven pulley 64 disposed rearwardly and upwardly of the drive pulley 62 (see FIGS. 3 and 5), to perform a primary continuous variable transmission of a rotational output of the crank shaft 60 on the gear box 41 side.

With respect to arrangement of the parts constituting the drive/power transmission system, the gear box 41 is disposed to the right in the width direction of the body from the drive pulley 62 of the V-belt type transmission 40 and also to the right from the main frames 20. The engine 25 and the V-belt type transmission 40 are disposed inside the right and left main frames 20. More specifically, the V-belt type transmission 40 is held between the gear box 41 and the engine 25.

The gear box 41 includes a case composed of right and left halves 41b and 41a. A biaxial in-line type gear train composed of an input gear 65, an idle gear 66 and a final gear 67 is contained in the case. An input shaft 68 mounted with the input gear 65 extends outwardly from the gear box 41 and the drive pulley 64 is mounted on the extension of the input shaft 68.

An idle shaft 69 mounted with the idle gear 66 extends outwardly from the gear box 41 opposite to the input shaft 68, and a brake disk 70 is mounted to the extension of the idle shaft 69. The brake disk 70 is braked by a brake caliper 70a provided on the half case 41b of the gear box 41 (see FIG. 5).

A final shaft 71 mounted with the final gear 67 is a hollow shaft, into which one end of the drive shaft 42 is removably fitted. The gear box 41 is filled with lubricating oil in which the gear train is dipped.

Figure 6:
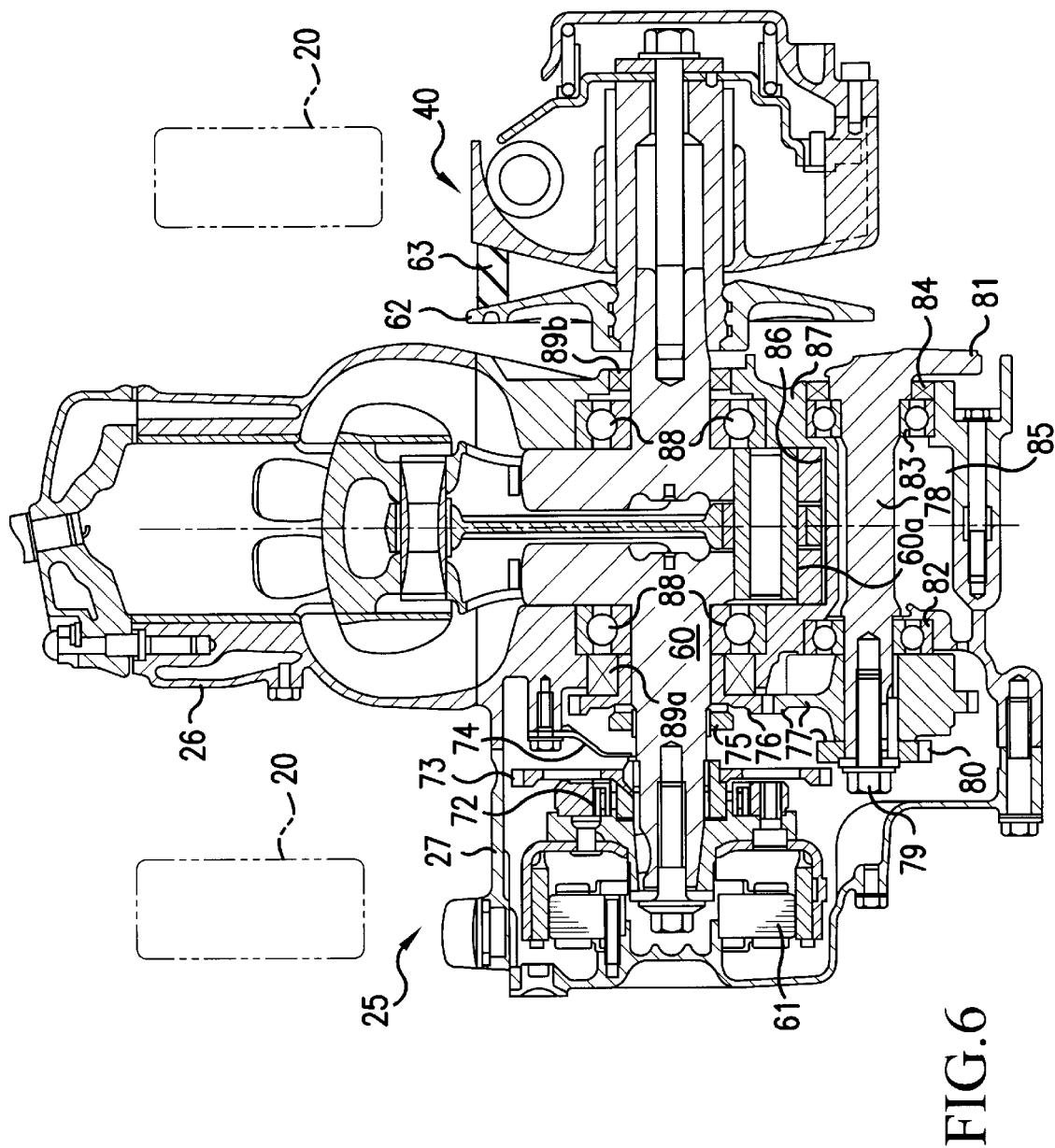
FIG. 6 is a sectional plan view of an engine portion.

As will be apparent from FIG. 6, a starter driven gear 73 is supported, at a portion near the ACG 61, by the crank shaft 60 of the engine 25 through a one-way clutch 72. The movement of the starter driven gear 73 in the thrust direction is restricted by a gear presser plate 74.

A balancer drive gear 76 fastened by a nut 75 is provided on the crank shaft 60, which is meshed with a balancer driven gear 77 for rotating a balancer shaft 78 is disposed in parallel to the crank shaft 60.

A pump drive gear 80 is mounted on one end of the balancer shaft 78 with a bolt 79, and a balancer weight 81 is integrally provided on the other end of the balancer shaft 78. Two intermediate portions of the balancer shaft 78 near the balancer driven gear 77 and the balancer weight 81 are rotatably supported on the crank case 27 by bearings 82 and 83. A seal 84 is provided outside the bearing 83 on the balancer weight 81 side.

A balancer chamber 85 for containing the balancer shaft 78 is partitioned, by a journal wall 87, from a crank chamber 86 for containing a crank weight 60a. The balancer driven gear 77 and the balancer weight 81 are disposed outside the crank chamber 86. The balancer chamber 85 is filled with lubricating oil in the crank case 27 and thereby the bearings 82 and 83 are dipped in the oil. The balancer chamber 85 is sealed from the exterior with a seal 84.

The crank shaft 60 is rotatably supported, at a portion near the crank weight 60a, on a journal wall 87 by a bearing 88, and the outside of the crank chamber 86 is sealed with seals 89a and 89b.

Figure 7:
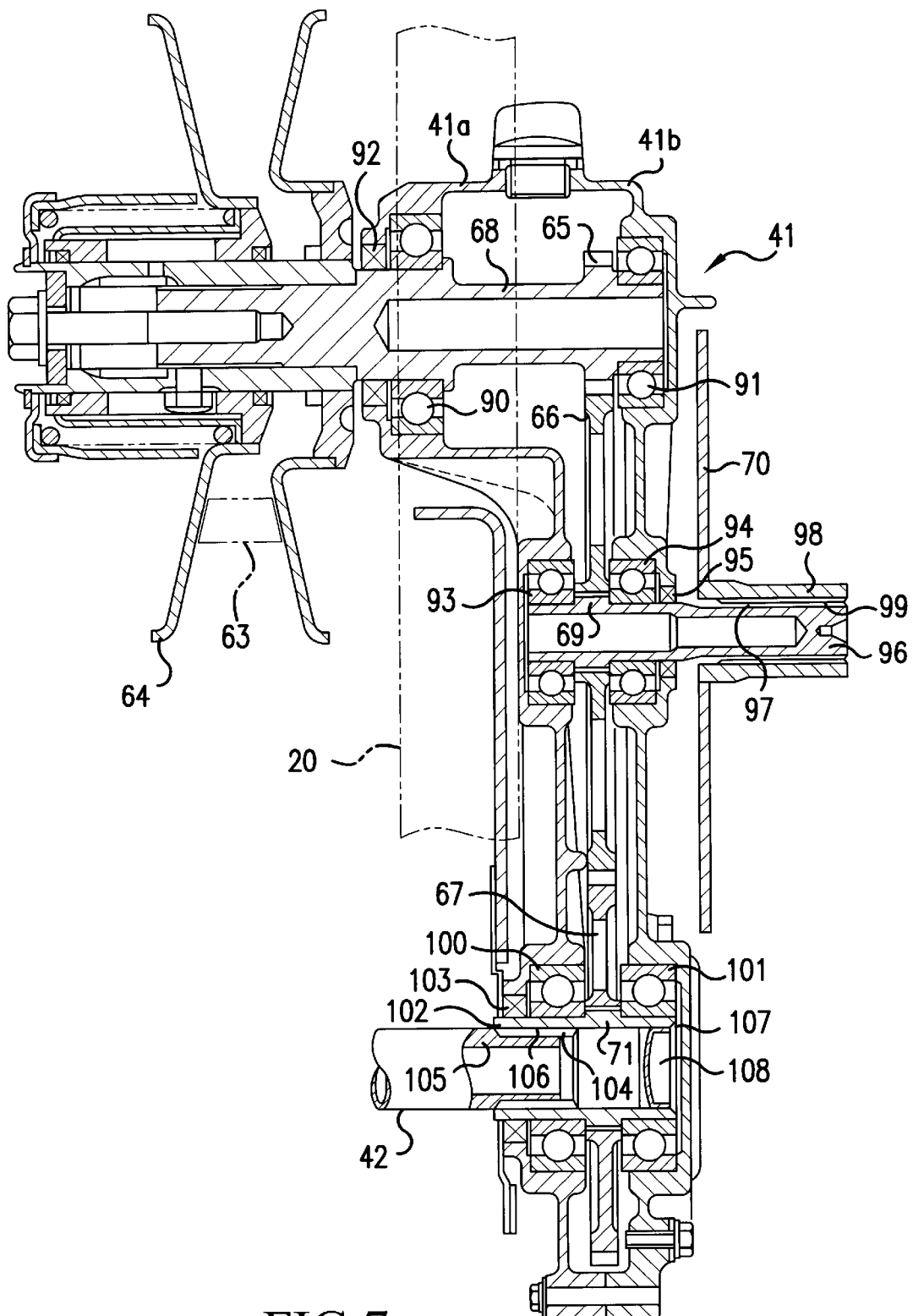
FIG. 7 is a sectional view of a driven pulley and a final reduction gear portion.

As will be apparent from FIG. 7, the input shaft 68 of the gear box 41 is rotatably supported by bearings 90 and 91, and the extension of the input shaft 68 extending from the gear box 41 on the driven pulley 64 side is provided with a seal 92.

The idle shaft 69 is, similarly, rotatably supported by bearings 93 and 94, and the extension of the idle shaft 69 extending from the gear box 41 on the brake disk 70 side is provided with a seal 95. A spline groove 97 is formed in an outer peripheral portion of the extension portion 96. A boss 98 to be fitted around the outer periphery of the extension portion 96 is provided at a central portion of the brake disk 70. A spline groove 99 is formed in an inner peripheral surface of the boss 98, and is engaged with the spline groove 97, whereby the boss 98 is movable in the axial direction.

The final shaft 71 is, similarly, rotatably supported by bearings 100 and 101. The final shaft 71 is a hollow shaft with one end 102 being opened on a side surface of the gear box 41. A seal 103 is provided around the one end 102. A spline groove 104 is formed in an inner surface of the one end 102 in such a manner so as to extend inwardly from the open end side.

One end 105 of the drive shaft 42 is fitted on the one end 102 side. A spline groove 106 formed in an outer peripheral portion of the one end 105 is engaged with the spline groove 104, allowing the final shaft 71 to be rotated integrally with the drive shaft 42. A cap 108 is fitted in the other end 107 of the final shaft 71 to seal the hollow final shaft 71.

Figure 8:
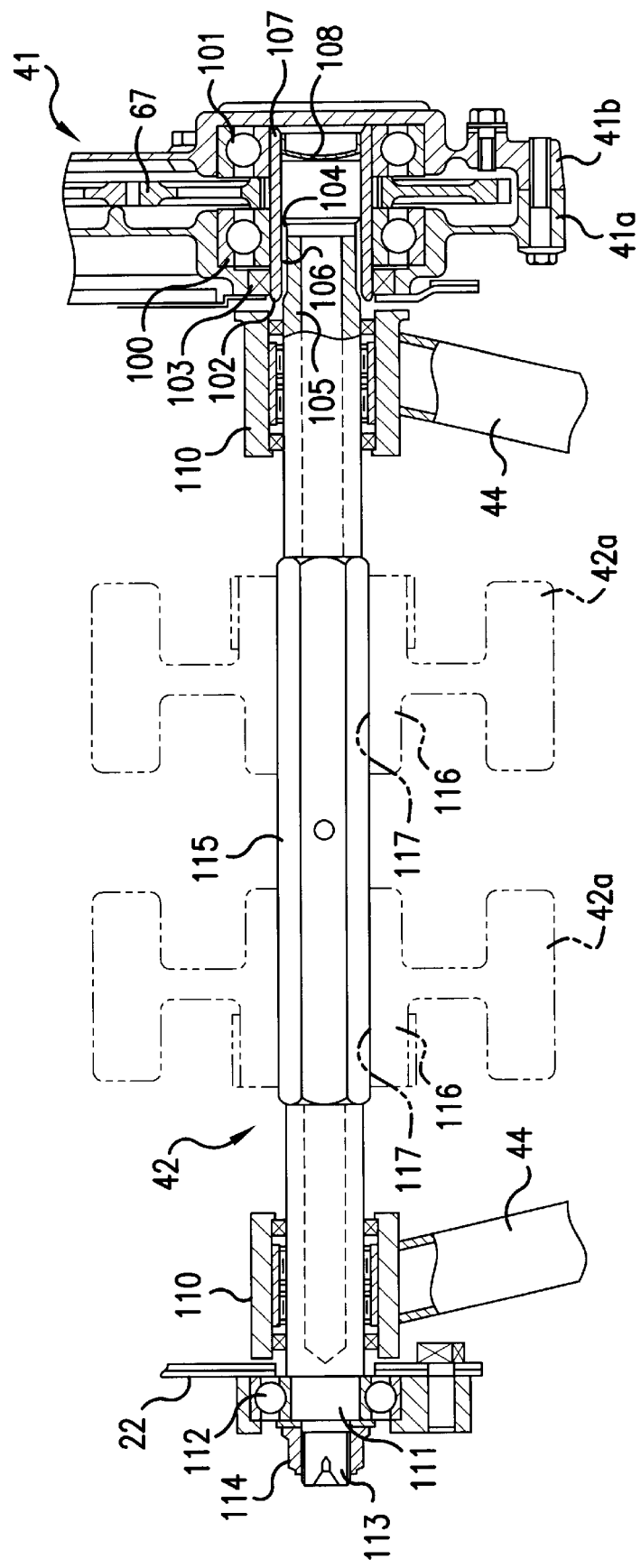
FIG. 8 is a sectional view showing a supporting structure of a drive shaft.

As will be apparent from FIG. 8, both end portions of the drive shaft 42 pass through and are supported by bearing supporting portions 110 provided at front end portions of the right and left rear arms 44. The other end opposite to the one end 105 forms a small diameter portion 111 which is rotatably supported by a bearing 112 supported by the pivot plate 22. A leading end of the small diameter portion 111 forms a projecting threaded portion 113 which is fastened to the bearing 112 by a nut 114.

An outer periphery of the intermediate portion of the drive shaft 42 is formed into a hexagonal portion 115 to be engaged with hexagonal holes formed in centers of the boss portions 116 of the drive wheels 42a, whereby the drive wheels 42a are rotatable integrally with the drive shaft 42.

Figure 4:
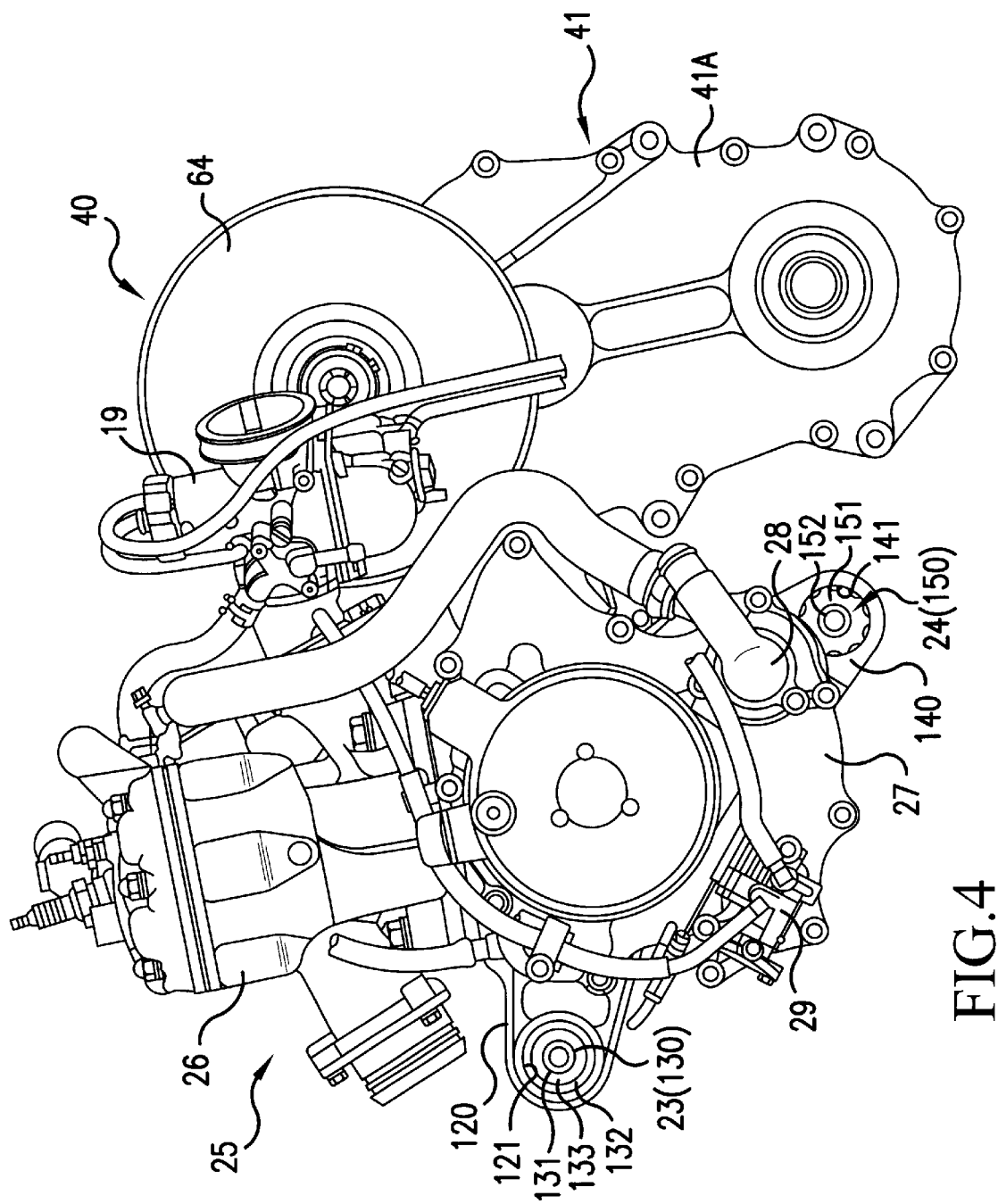
FIG. 4 is a left side view of the drive/power transmission system.
Figure 5:
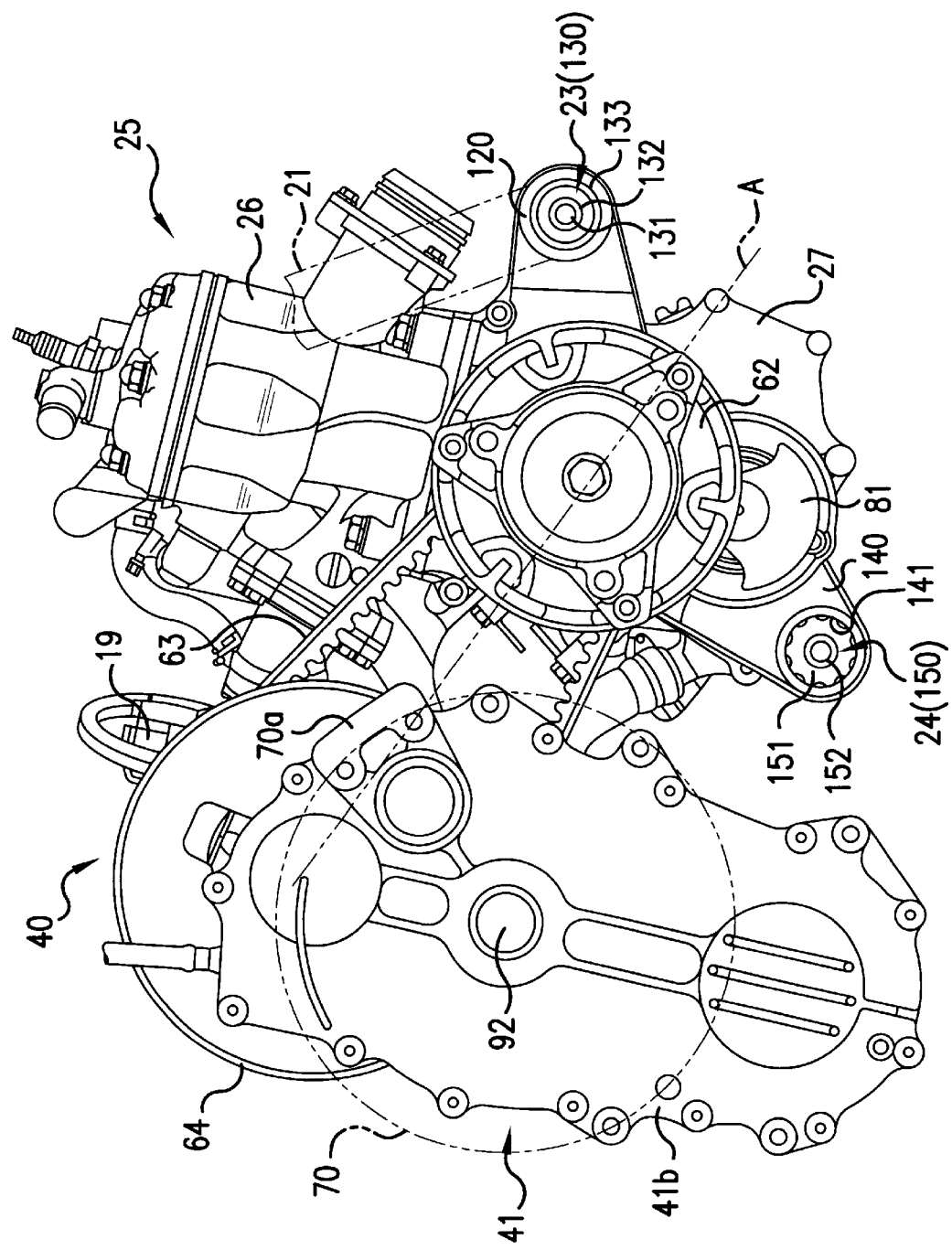
FIG. 5 is a right side view of the drive/power transmission system.

Next, the engine supporting structure will be more fully described with reference to FIGS. 4 and 5. As will be apparent from these figures, a ring bushing 130, which is one example of the front side elastic mount 23, is fitted in a front side body mounting portion 120 integrally projecting forward from the front portion of the crank case 27. The ring bushing 130 is a cylindrical member having a known structure in which a rubber 133 is packed between metal made inner and outer cylinders 131 and 132.

A rear side body mounting portion 140 integrally projects rearwardly from the rear portion of the crank case 27. A mount rubber 150, which is one example of the rear side elastic mount 24, is fitted in the rear side body mounting portion 140. The mount rubber 150 includes a metal collar 152 at an axial portion thereof and a cylindrical rubber 151 integrally provided around the metal collar 152. In addition, corrugated grooves are formed in an outer peripheral surface portion of the cylindrical rubber 151. The mount rubber 150 is fitted in a mounting hole 141 formed through the rear side body mounting portion 140.

Figure 11:
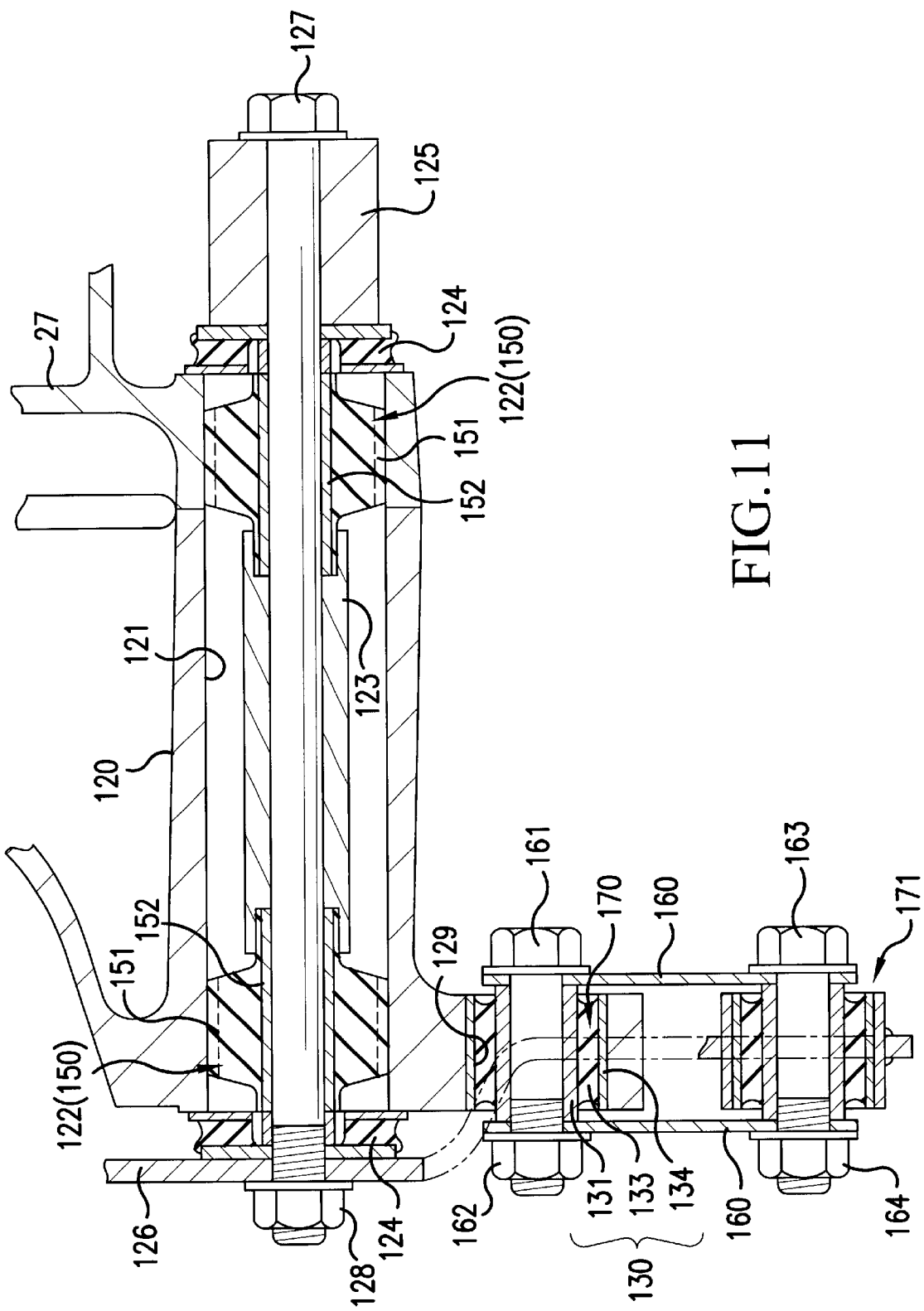
FIG. 11 is a sectional view of a front side body mounting portion in the embodiment shown in FIG. 9.
Figure 12:
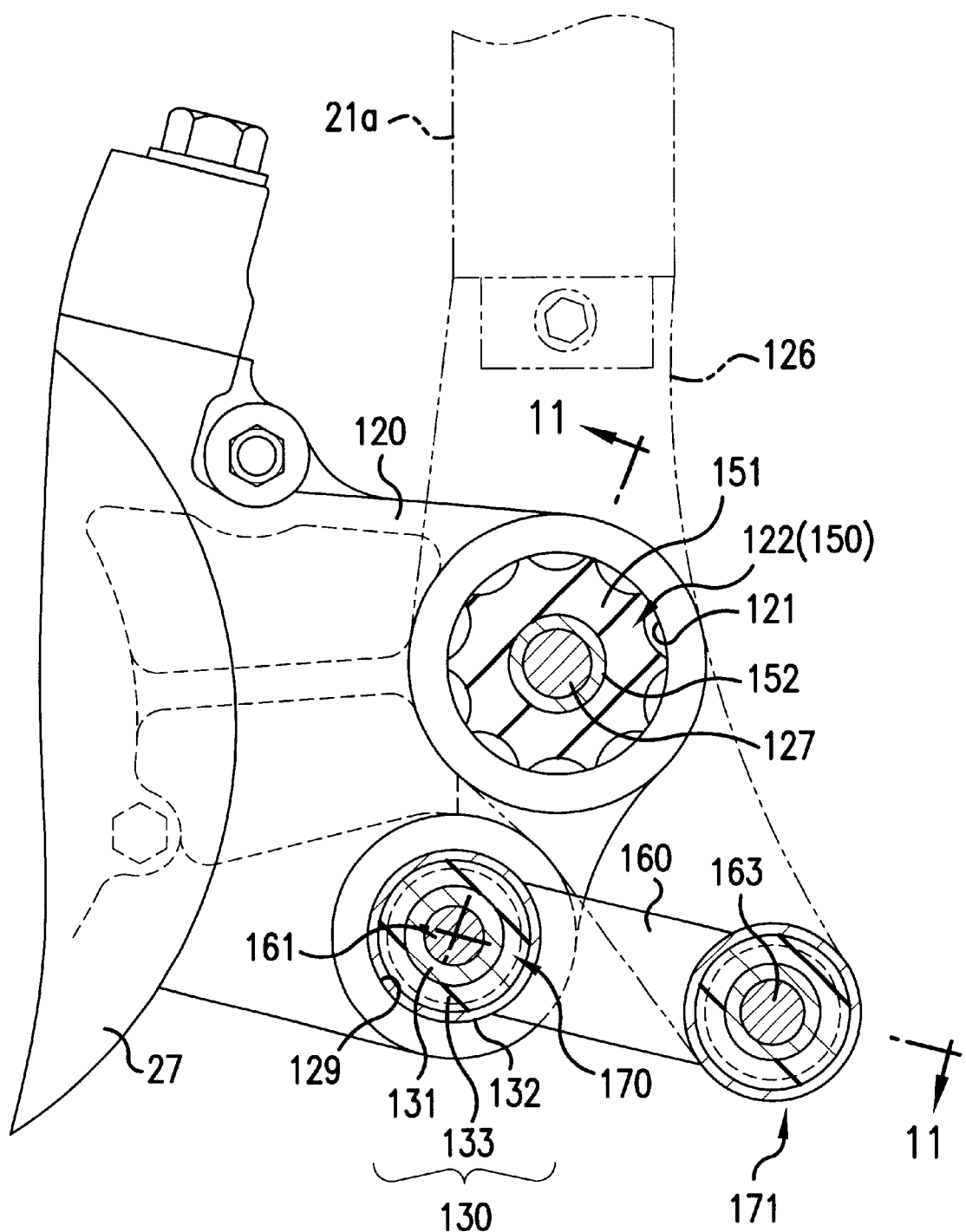
FIG. 12 is a view, seen from the right side of a crank case, of the front side body mounting portion.

The front side elastic mount 23, represented by the ring bush, is higher in hardness than the rear side elastic mount 24, represented by the mount rubber. Each mount is connected to the body side with a mounting bolt (not shown) through an inner cylinder 131 or a collar 152. It should be noted that a ring bushing and a mount rubber which will be described in another embodiment with reference to FIGS. 11 and 12 are substantially similar to the above ring bushing and mount rubber shown in FIGS. 4 and 5 in terms of structure, mounting structure to the body mounting portion and the body side.

The function of this embodiment will be described below. When vibration is applied from the driven pulley 64 side to the engine 25, the front side body mounting portion 120, which has the front side elastic mount 23 (ring bushing 130) being higher in hardness than the rear side elastic mount 24, allows the engine 25 to be turned around the front side body mounting portion 120 along the rotational direction thereof, and it also allows the engine 25 to be restricted in its movement in the longitudinal direction of the body.

At the same time, the rear side elastic mount 24 (mount rubber 150), which is softer than the front side elastic mount 23, is elastically deformed and thereby it allows the engine 25 to be moved in the radial direction of the rear side elastic mount 24. Thus, the rear side elastic mount 24 absorbs vibration of the engine. As a result, it is possible to reduce the movement of the engine 25 due to vibration of the engine as a whole, and hence to easily keep the center-to-center distance between the drive pulley 62 and the driven pulley 64 at a nearly constant value.

Further, since the mounting position at which the front side body mounting portion 120 is mounted to the down tube 21 by the front side elastic mount 23 is located near the extension of an action line connecting the centers of the drive pulley 62 and the driven pulley 64 to each other (see FIG. 5), the movement of the engine 25 due to the drive reaction force can be further reduced.

Further, vibration of the engine 25 can be suppressed by a simply design in which the hardness of the front side elastic mount 23 is different from that of the rear side elastic mount 24. As a result, vibration transmitted to accessories can be reduced, to thereby enhance the durability and improve the driving comfort. Also, the effect can be obtained only by mounting the front side elastic mount 23 and the rear side elastic mount 24 without any specific technique.

Further, by combination of the ring bushing 130 and the mount rubber 150 which are structurally different from each other in hardness as the elastic body, the hardness of the front and rear mounts can be easily made different from each other.

In this way, the main functions for suppressing vibration of the engine can be differently distributed to the front and rear mounting portions with a relatively simple structure, as a result of which vibration of the entire engine can be suppressed and thereby a change in distance between the drive pulley and the driven pulley can be reduced.

Since vibration of the engine can be thus suppressed, vibration transmitted to accessories can be also reduced, to thereby enhance the durability and improve the riding comfort. Further, the functions can be simply distributed to the front and rear elastic members without necessity of any special high-level technique.

The change in hardness between the front and rear elastic members is not limited to the combination of the different structures of the front and rear elastic members, for example, the combination of the ring bushing 130 and the mount rubber 150 in this embodiment. The front and the rear elastic members may be of the same structure, for example, the ring bushing 130 or mount rubber 150, and the elastic constants (that is, hardness) of the elastic materials such as rubber forming both the elastic members of the front and rear mounting portions may be made different from each other.

Figure 9:
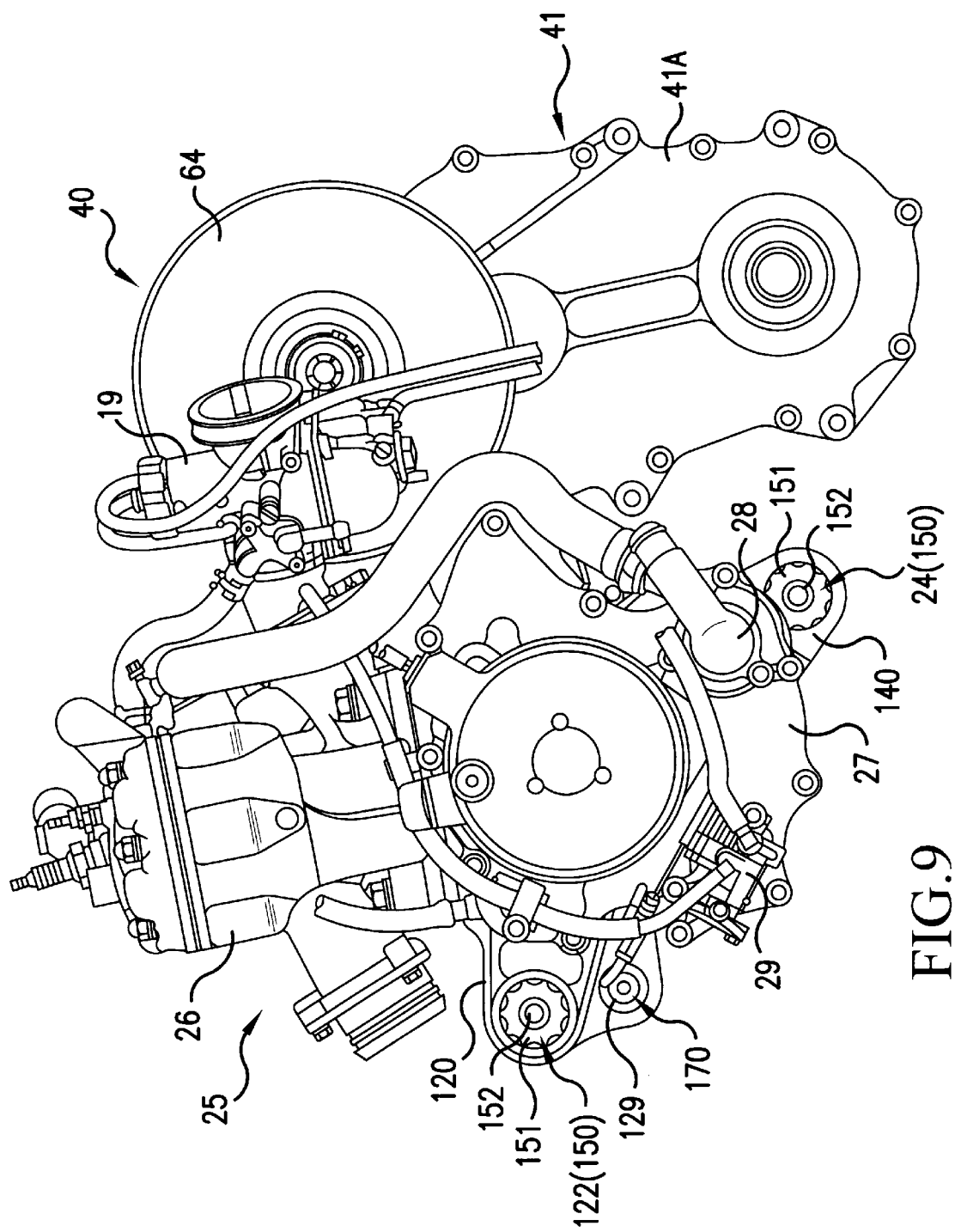
FIG. 9 is a left side view, similar to FIG. 4, of essential portions of another embodiment.
Figure 10:
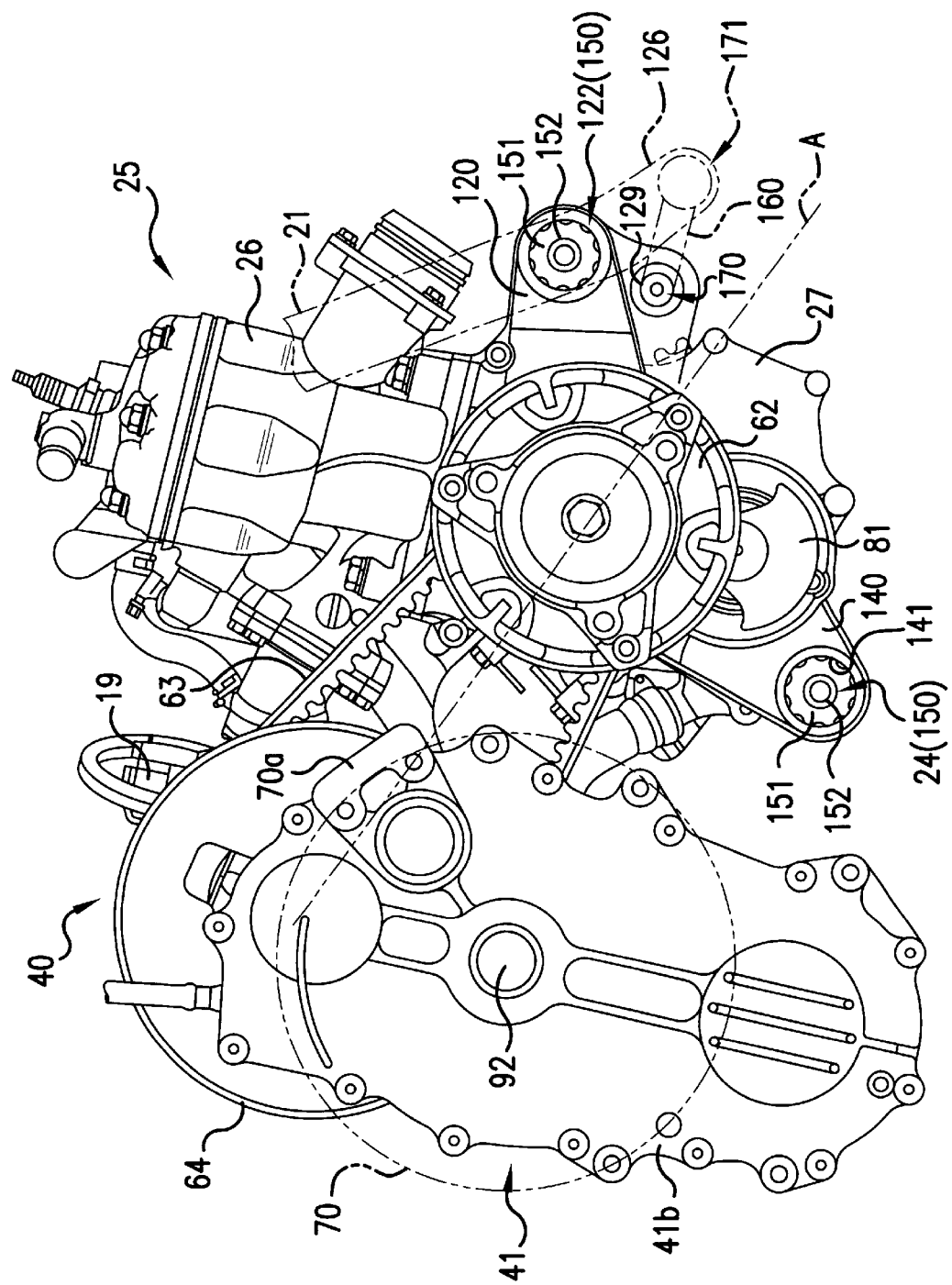
FIG. 10 is a right side view, similar to FIG. 4, of the embodiment shown in FIG. 9.
Figure 13:
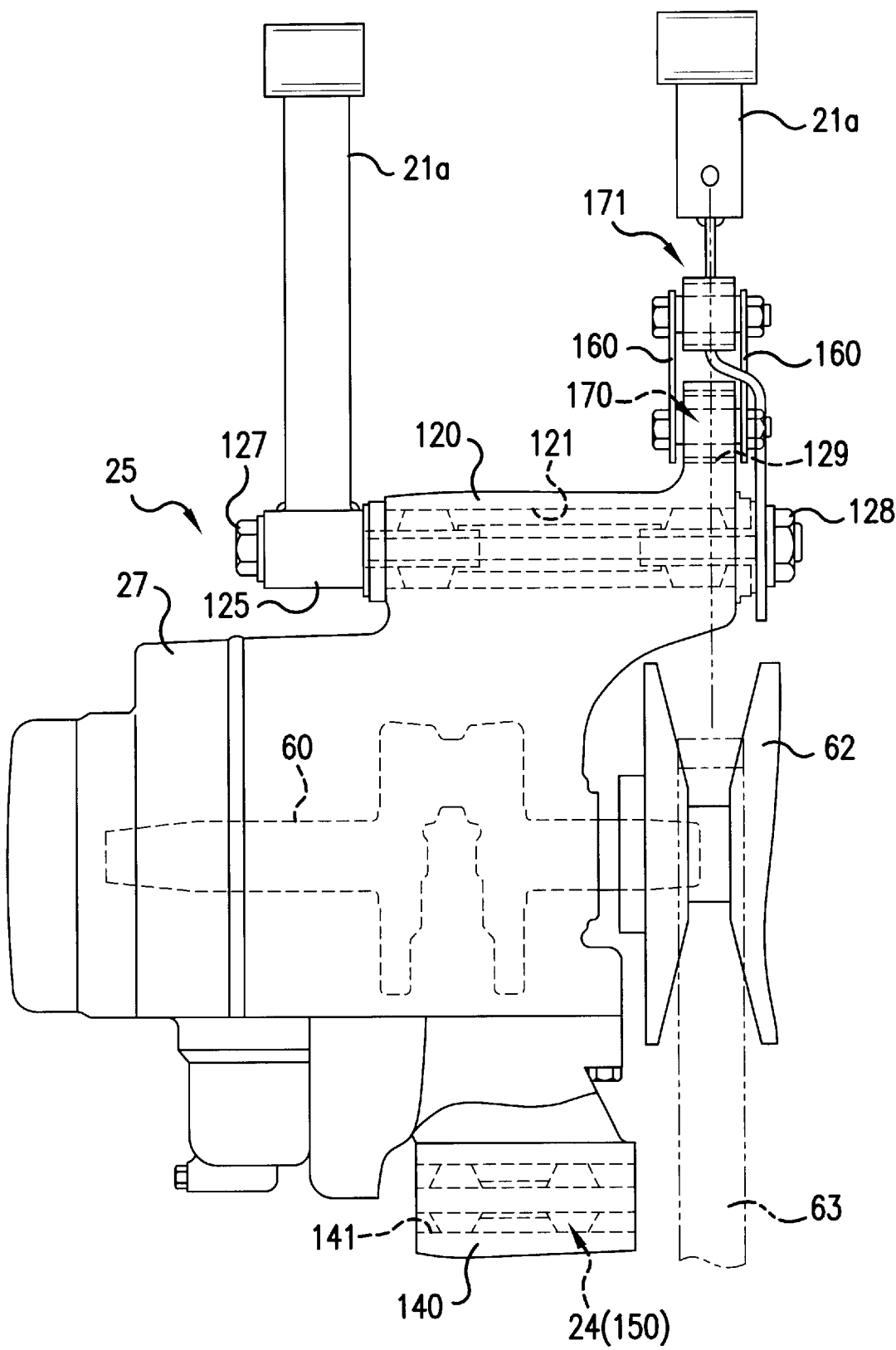
FIG. 13 is a schematic plan view showing an arrangement relationship of a tension rod in the front side body mounting portion shown in FIG. 12.

Next, another embodiment of the engine supporting structure will be described with reference to FIGS. 9 to 13. It should be noted that parts common to those shown in the previous embodiment are indicated by the common characters. FIGS. 9 and 10 are similar to FIGS. 4 and 5; FIG. 11 is a sectional view taken on line 11—11 of FIG. 12, showing a rear side body mounting portion 120; FIG. 12 is a view illustrated from a right side of the crank case 27, showing the front side body mounting portion 120, with parts partially omitted; and FIG. 13 is a schematic plan view showing an arrangement relationship of a tension rod.

Referring to FIGS. 9 to 13, a main mount 122 is fitted in a mounting hole 121 in the front side body mounting portion 120 in such a manner as to pass therethrough in the width direction of the body. The main mount 122 is represented by a mount rubber 150 having corrugated grooves at its outer peripheral surface portion like the mount rubber in the previous embodiment. In this embodiment, since the crank case 27 is divided into right and left parts, a pair of right and left parts of the mount rubber 150 are press-fitted in the mounting hole 121 from both end sides, and end portions of both collars 152 of the right and left parts of the mount rubber 150 are connected to each other by means of a joint collar 123.

Right and left sides of the front side body mounting portion 120 abut onto a boss 125 and a supporting plate 126 through elastic seats 124 respectively. The boss 125 is provided at a lower end portion of the down-tube 21 (see FIG. 2) extending downwardly from the left side main frame 20. The supporting plate 126 is mounted to a lower end portion of the down-tube 21a extending downwardly from the right side main frame substantially in parallel to the down-tube 21, as shown in FIG. 12. The boss 125 and the supporting plate 126 are fastened to both of the sides of the front side body mounting portion 120 by a bolt 127 passing therethrough and a nut 128.

The front side body mounting portion 120 has another mounting hole 129 formed under the mounting hole 121. A first mount 170 for a tension rod, which is one example of the ring bushing 130, is fitted in the mounting hole 129. The ring bushing 130 forming the first mount 170 has the same structure as that described above, that is, a known damper in which a rubber 133 is packed between inner and outer cylinders 131 and 132. The ring bushing 130 is higher in hardness than the mount rubber 150.

One-sided ends of a pair of connecting plates 160 abut onto both sides of the first mount 170 for the tension rod and are fastened to each other by means of a bolt 161 and a nut 162. The right and left connecting plates 160 extend forwardly in parallel to each other, and front end portions thereof abut onto both ends of a second mount 171 for a tension rod and are fastened to each other by means of a bolt 163 and a nut 164. The second mount 171 has another ring bushing having the same structure as that of the ring bushing 130.

The second mount 171 for the tension rod has the same structure as that of the ringing bushing 130, and is fitted and welded to the extended end portion of the supporting plate 126. The right and left connecting plates 160 function as a tension rod connecting the ring bushing 130 on the engine side to the ring bushing 171 on the body side.

As shown in FIG. 13, the tension rod (160, 170, 171) is located on the extension of the V-belt 63 of the V-belt type transmission 40. The center line C of the tension rod is positioned within a plane parallel to a rotational plane of the V-belt 63, and the front side body mounting portion 120 and first and second mounts 170 and 171 for the tension rod are located near the extension of the action line connecting the centers of the drive pulley 62 and the driven pulley 64 (see FIG. 10).

The second mount 171 for the tension rod, first mount 170 for the tension rod, and the main mount 122 form an elastic mount for the front side body mounting portion 120.

The rear side elastic mount 24 in the rear side body mounting portion 140 is the same as that in the previous embodiment, in which a mount rubber 150 is fitted in a mounting hole 141 formed in the rear side body mounting portion 140 just as shown in FIG. 11, and therefore, the detailed explanation thereof is omitted.

The tension rod (160, 170, 171) is thus located near the extension of the belt line of the V-belt 63, so that the engine 25 is allowed to be turnable around the connecting portion between the first mount 170 and the front side body mounting portion 120 and the connecting portion between the second mount 171 and the supporting plate 126 and to be restricted in the longitudinal direction. At the same time, the rear side elastic mount 24 in the rear side body mounting portion 140 is elastically deformed to mainly absorb the movement of engine 25 in the radial direction. As a result, vibration of the entire engine 25 can be absorbed by the rear side elastic mount 24 and is not transmitted to the body side.

Further, the twisting due to vibration of the engine 25 can be restricted by the tension rod (160, 170, 171), and the main mount 122 can be used commonly to the mount rubber 150 of the rear side elastic mount 24.

Next, a further embodiment of the engine supporting structure will be described with reference to FIGS. 14(a) and 14(b). FIG. 14(a) is similar to FIG. 13, except that a front side body mounting portion 120 has a supporting structure which is turnable through a collar and a hanger shaft.

A rear side body mounting portion 140 has the same structure as that shown in FIG. 13. That is, a rear side elastic mount 24 is formed of a mount rubber 150, and is disposed on the body of the engine 25 in the same layout as shown in FIG. 2.

The front side body mounting portion 120 is disposed between the right and left down-tubes 21. A cylindrical hanger shaft 180 is inserted in a through-hole 121 formed in the front side body mounting portion 120 in the width direction of the body. Both ends of the hanger shaft 180 are aligned with through-holes 181 formed in lower end portions of the down-tubes 21. Then, a long-sized bolt 182 is inserted in the through-hole 181 on one side, passing through the hanger shaft 180, and projects from the through-hole 181 on the other side. The projecting end portion of the bolt 182 is secured with a nut 183. Thus, the front side body mounting portion 120 is mounted to the body side.

Outer peripheral portions of both end portions of the hanger shaft 180 are brought into sliding-contact with collars 185 fitted in large-diameter holes 184 formed at both ends of the through-hole 121, so that the front side body mounting portion 120, that is, the engine 25 is turnable around the engine hanger shaft 180.

Further, as illustrated in FIG. 14(b), since the right and left end portions of the front side body mounting portion 120 are separated from the right and left down-tubes 21 with slight gaps 186 put therebetween, the engine 25 is easily turnable. In addition, a radial gap 187 is formed between each collar 185 and the hanger shaft 180.

Accordingly, although the front side body mounting portion 120, that is, the engine 25 is not elastically supported to the body, it can be moved around the hanger shaft 180 in the rotational direction because the rear side body mounting portion 140 is mounted on the body side through the mount rubber 150.

The engine 25 is thus moved only in the rotational direction around the hanger shaft 180 and is restricted in the longitudinal direction. At the same time, the rear side body mounting portion 140 allows the engine 25 to be moved in the radial direction with the mount rubber 150 being deformed, to thereby absorb the vibrations of the engine.

Further, since the movement of the front portion of the engine 25 is reduced, the sealing performance at a connection portion between the cylinder portion 26 and the exhaust pipe 37 mounted at the front portion thereof (see FIG. 2) can be kept desirable for a long period of time.

Additionally, since the mounting position of the hanger shaft 180 is located near the extension of the action line A connecting the centers of the drive pulley 62 and the driven pulley 64 to each other (see FIG. 5), the movement of the engine 25 due to the drive reaction force can be further reduced.

It should be noted that the present invention is not limited to the above embodiments, and many changes and variations may be made without departing from the scope of the present invention. For example, the mount in the front side body mounting portion 120 shown in FIG. 2 may be replaced from the mount rubber 150 to the ring bushing 130, and the tension rod may be replaced from the connecting plate 160 shown in the previous embodiment to a connecting round rod.

With respect to the front and rear body mounting portions 120 and 140, the front and rear side elastic mounts 23 and 24 may be not directly fitted to the crank case 27. For example, these mounts may be disposed between the engine 25 and the vehicular body; mounting members may be provided extending from these mounts to the body and the engine; and the engine side mounting member may be supported.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine supporting device for a vehicle having a pair of main frames, with each main frame having a down tube and a pivot plate, an engine arranged in an upright position and a gear box containing a reduction gear train being separately formed and separately supported on a vehicular body, a drive pulley of a V-belt type transmission being mounted on an output shaft of said engine, a driven pulley of said V-belt type transmission being mounted on an input shaft of said gear box; and a V-belt wound around said drive pulley and said driven pulley, said engine supporting device comprising:

front and rear mounting portions supported by the vehicular body, said front and rear mounting portions being provided on a crank case of said engine on front and rear sides of said drive pulley for positioning said drive pulley between said mounting portions, said front and rear mounting portions extending substantially parallel to an axis of said drive pulley;

said front mounting portion is a supporting point around which said engine is turned around a front mounting shaft due to a drive reaction force of said V-belt type transmission and the rear mounting portion is arranged lower than said front mounting portion and below said crankcase to move the engine in a radial direction perpendicular to a rear mounting shaft for absorbing vibration of said engine by deformation of an elastic member which is provided to the rear mounting portion;

wherein said front and rear mounting portions are mounted on the vehicular body through front and rear elastic members respectively, and one of said front and rear elastic members is higher in hardness relative to the hardness of the other of said front and rear elastic members;

wherein said front mounting shaft pierces through said front mounting portion and the pair of down pipes in a perpendicular direction, and said rear mounting shaft pierces through the rear mounting portion and the pair of pivot plates in a perpendicular direction; and wherein said V-belt operably connects said drive shaft of said engine and said driven shaft of said gear train, said gear train being mounted separately from the engine on the vehicle body.

2. The engine supporting device according to claim 1, wherein said front and rear mounting portions are mounted on the vehicular body through front and rear elastic members, respectively, and at least one of said front and rear elastic members is formed of a ring bushing.

3. The engine supporting device according to claim 1, wherein said mounting portion functioning as a supporting point around which said engine is turned is connected to the vehicular body through a tension rod.

4. The engine supporting device according to claim 1, wherein said mounting portion functioning as a point around which said engine is turned is connected to the vehicular body through said front mounting shaft and a collar or bearing turnably supporting said front mounting shaft.

5. The engine supporting device according to claim 1, wherein said front mounting portion includes a front elastic member and the rear mounting portion includes a rear elastic member wherein the front elastic member is constructed from a harder material relative to the rear elastic member.

6. An engine supporting device mounted on a vehicle body having a longitudinal direction and a transverse direction, having a pair of main frames, with each main frame having a down tube and a pivot plate, and having an engine arranged in an upright position and a gear box containing a reduction gear train being separately formed and separately supported on the vehicular body, a drive pulley of a V-belt type transmission being mounted on an output shaft of said engine, a driven pulley of said V-belt type transmission being mounted on an input shaft of said gear box; and a V-belt wound around said drive pulley and said driven pulley, said engine supporting device comprising:

a first mounting shaft supported by the a pair of down tubes and extending in the transverse direction of said vehicular body;

a second mounting shaft supported by the a pair of pivot plates and extending in the transverse direction of said vehicular body;

said first mounting shaft being secured on a housing of an engine on a front side;

said second mounting shaft being secured on a housing of an engine at a position being displaced a predetermined distance from said first mounting shaft with said drive pulley being positioned between said first and second mounting shafts, said first and second mounting shafts extending substantially parallel to an axis of said drive pulley;

said first mounting shaft providing a supporting point around which said engine is turned due to a drive reaction force of said V-belt type transmission, said first mounting shaft piercing said pair of down tubes; and the second mounting shaft pierces said pair of pivot plates and is arranged lower than said first mounting shaft and below said crankcase to move the engine in a radial direction for absorbing vibration of said engine by deformation of said elastic member;

wherein said first and second mounting shafts are mounted through first and second elastic members respectively, and one of said first and second elastic members is higher in hardness relative to the hardness of the other of said first and second elastic members; and wherein said V-belt operably connects said drive shaft of said engine to said driven pulley of said gear train, said gear train being mounted separately from said engine on the vehicle body.

7. The engine supporting device according to claim 6, wherein said first and second mounting shafts are mounted on the vehicular body through first and second elastic members, respectively, and at least one of said first and second elastic members is a ring bushing.

8. The engine supporting device according to claim 6, wherein said mounting portion providing a supporting point around which said engine is turned is connected to the vehicular body through a tension rod.

9. The engine supporting device according to claim 6, wherein said mounting portion providing a supporting point around which said engine is turned is connected to the vehicular body through said first mounting shaft and a collar turnably supporting said first mounting shaft.

10. The engine supporting device according to claim 6, wherein said mounting portion providing a supporting point around which said engine is turned is connected to the vehicular body through said first mounting shaft and a bearing turnably supporting said first mounting shaft.

11. The engine supporting device according to claim 6, wherein said first mounting shaft includes a first elastic member and the second mounting shaft includes a second elastic member wherein the first elastic member is constructed from a harder material relative to the second elastic member.

* * * * *